United States Patent
Ju et al.

(10) Patent No.: US 11,872,701 B2
(45) Date of Patent: Jan. 16, 2024

(54) TOTAL CENTROID STATE ESTIMATION METHOD, HUMANOID ROBOT AND COMPUTER READABLE STORAGE MEDIUM USING THE SAME

(71) Applicant: UBTECH ROBOTICS CORP LTD, Shenzhen (CN)

(72) Inventors: Xiaozhu Ju, Shenzhen (CN); Yuesong Wang, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 214 days.

(21) Appl. No.: 17/485,412

(22) Filed: Sep. 25, 2021

(65) Prior Publication Data

US 2022/0193902 A1  Jun. 23, 2022

(30) Foreign Application Priority Data

Dec. 23, 2020  (CN) .......................... 202011535826.X

(51) Int. Cl.
  *B25J 9/16*  (2006.01)
(52) U.S. Cl.
  CPC .......... *B25J 9/1664* (2013.01); *B25J 9/1607* (2013.01); *G05D 2201/0217* (2013.01)
(58) Field of Classification Search
  CPC .................. G05D 2201/0217; B25J 9/1607
  See application file for complete search history.

(56) References Cited

FOREIGN PATENT DOCUMENTS

CN  104015191 A  9/2014

OTHER PUBLICATIONS

H. Dallali et al., "Development of a dynamic simulator for a compliant humanoid robot based on a symbolic multibody approach," 2013 IEEE International Conference on Mechatronics (ICM), Vicenza, Italy, 2013, pp. 598-603 (Year: 2013).*

D. Kim, Y. Zhao, G. Thomas, B. R. Fernandez and L. Sentis, "Stabilizing Series-Elastic Point-Foot Bipeds Using Whole-Body Operational Space Control," in IEEE Transactions on Robotics, vol. 32, No. 6, pp. 1362-1379, Dec. 2016 (Year: 2016).*

Orin, David E., Ambarish Goswami, and Sung-Hee Lee. "Centroidal dynamics of a humanoid robot." Autonomous robots 35 (2013): 161-176 (Year: 2013).*

(Continued)

*Primary Examiner* — Adam R Mott
*Assistant Examiner* — Matthew C Gammon

(57) ABSTRACT

A total centroid state estimation method as well as a humanoid robot and a computer readable storage medium using the same are provided. The method includes: obtaining a motion state of each real joint of the humanoid robot and a motion state of its floating base, where the floating base is equivalent to a plurality of sequent-connected virtual joints; calculating a joint position, a centroid position, and a rotation matrix of each link in the world coordinate system in sequence using the chain rule of homogeneous multiplication according to the position of the joint corresponding to the link to solve a Jacobian matrix of the centroid of the link; solving a total centroid Jacobian matrix based on the Jacobian matrix of the centroid of each link and the total mass; and calculating the total centroid velocity based on the total centroid Jacobian matrix and other parameters.

20 Claims, 7 Drawing Sheets

(56) References Cited

OTHER PUBLICATIONS

Muscolo, Giovanni Gerardo, Darwin Caldwell, and Ferdinando Cannella. 2017. "Calculation of the Center of Mass Position of Each Link of Multibody Biped Robots" Applied Sciences 7, No. 7: 724 (Year: 2017).*

M. Azad, J. Babič and M. Mistry, "Dynamic manipulability of the center of mass: A tool to study, analyse and measure physical ability of robots," 2017 IEEE International Conference on Robotics and Automation (ICRA), Singapore, 2017, pp. 3484-349 (Year: 2017).*

SangJoo Kwon and Yonghwan Oh, "Estimation of the center of mass of humanoid robot," 2007 International Conference on Control, Automation and Systems, Seoul, Korea (South), 2007, pp. 2705-2709 (Year: 2007).*

S. Cotton, A. P. Murray and P. Fraisse, "Estimation of the Center of Mass: From Humanoid Robots to Human Beings," in IEEE/ASME Transactions on Mechatronics, vol. 14, No. 6, pp. 707-712, Dec. 2009 (Year: 2009).*

L. Yan, Z. Mu and W. Xu, "Base centroid virtual manipulator modeling and applications for multi-arm space robots," 2014 13th International Conference on Control Automation Robotics & Vision (ICARCV), Singapore, 2014, pp. 1542-1547 (Year: 2014).*

S. Cotton, A. Murray and P. Fraisse, "Statically equivalent serial chains for modeling the Center of Mass of humanoid robots," Humanoids 2008—8th IEEE-RAS International Conference on Humanoid Robots, Daejeon, Korea (South), 2008, pp. 138-144 (Year : 2008).*

Zhang H, Zhu Z, Tang B, Yuan J. The establishment and verification of kinematic equation of all link centroid of the manipulator mounted on a satellite. Proceedings of the Institution of Mechanical Engineers, Part G: Journal of Aerospace Engineering. 2019;233(5):1801-1819 (Year: 2019).*

* cited by examiner

TOTAL CENTROID STATE ESTIMATION METHOD, HUMANOID ROBOT AND COMPUTER READABLE STORAGE MEDIUM USING THE SAME

CROSS REFERENCE TO RELATED APPLICATIONS

The present disclosure claims priority to Chinese Patent Application No. 202011535826.X, filed Dec. 23, 2020, which is hereby incorporated by reference herein as if set forth in its entirety.

BACKGROUND

1. Technical Field

The present disclosure relates to humanoid robot technology, and particularly to a total centroid state estimation method as well as a humanoid robot, and a computer readable storage medium using the same.

2. Description of Related Art

In the motion control of humanoid robots, the control of the total centroid (i.e., the whole-body centroid) of a robot is essential. For example, in the balance control of the robot, it needs to guarantee that the zero-moment-point (ZMP) of the total centroid is within the polygon of the sole supporting of the robot. For another example, the gait control of the robot needs to drive the total centroid of the robot to move. Since a humanoid robot has more degrees of freedom and has a plurality of links, its total centroid cannot be directly measured and must be obtained by other means. The common practice is to equate the total centroid of the humanoid robot to the position of the waist, while it is only an approximation method that cannot be used to perform accurate centroid control.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings can be obtained according to the drawings without creative efforts.

DETAILED DESCRIPTION

Figure 1:
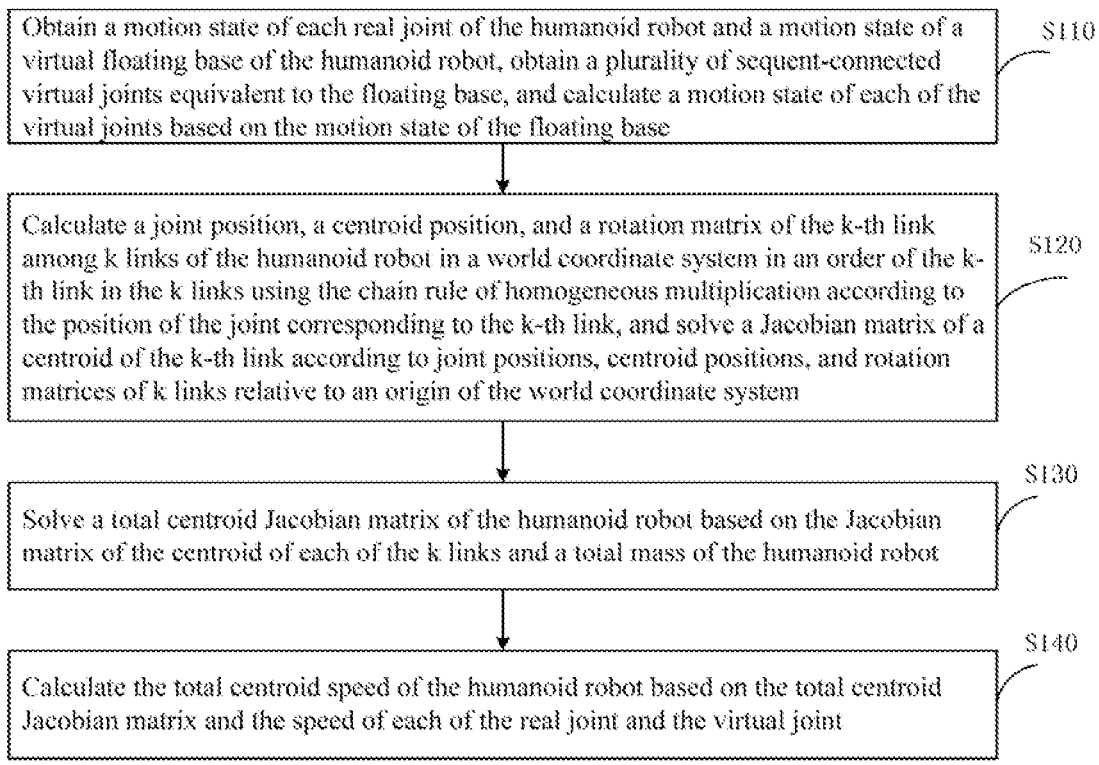
FIG. 1 is a flow chart of an embodiment of a total centroid state estimation method according to the present disclosure.

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure.

Generally, the components in the embodiments of the present disclosure that are described and shown in the drawings may be arranged and designed in various different configurations. Therefore, the following detailed descriptions for the embodiments of the present disclosure are not intended to limit the scope of the present disclosure, but merely represents the selected embodiments of the present disclosure. Based on the embodiments of the present disclosure, all other embodiments obtained by those skilled in the art without creative work shall fall within the scope of the present disclosure.

To describe the precise position of the humanoid robot during its walking, it requires selecting a fixed origin of the world coordinate system. The fixed origin is also absolute. In addition, a floating frame attached on the body of the robot will be further selected to construct a robot coordinate system. In the embodiments of the present disclosure, since the robot keeps walking, the position of the floating frame in the world coordinate system keeps changing and is therefore called the floating base. Generally, the fixed origin of world coordinate system will be set and fixed between the two feet of the robot with its initial position. Moreover, the floating frame is usually located at its total centroid with its axis aligned with the world coordinate system. The transformation between the floating frame and the fixed origin of the world coordinate system can be described in 6 Degree-of-Freedoms (DoFs), termed the floating base.

The centroid control is essential for the balance and the gait of the robot. To accurately describe the ZMP, perform acceleration-level whole-body motion control or the like, it is essential to construct the Jacobian matrix of the total centroid of the robot and its derivative, thereby calculating the motion state of the total centroid of the robot including the acceleration. Since the joints of a humanoid robot have numerous degrees of freedom and complicated structure, if differentiation is used to obtain the derivative of the Jacobian matrix of the centroid (i.e., center of mass), there will be not only a large computation resources but also very error-prone for the real-time control with a high servo-rate; and if a numerical difference is used, there will have the problem of numerical instability and is difficult to guarantee the convergence.

To resolve the problems mentioned above, the embodiments of the present disclosure provide a total centroid state estimation method. This method utilizes the cross product calculation to solve the analytical expression of the Jacobian matrix and solve the Jacobian matrix and its derivative in a recursive manner. And it can reduce the error of calculations, thereby bringing great convenience to the calculation and control of the position, velocity and acceleration of the total centroid of the robot.

Embodiment 1

FIG. 1 is a flow chart of an embodiment of a total centroid state estimation method according to the present disclosure.

The method can be applied to a humanoid robot to realize its gait control, whole-body motion control, and the like. The humanoid robot may have a head (with 3 DoFs), a trunk (with 3 DoFs), two arms (with 7 DoFs each), and two legs (with 6 DoFs each) that are connected via joints. This method provides a solution for the Jacobian matrix of the total centroid of the robot that can be used to estimate the motion state of the total centroid, which not only have high calculation efficiency but also free from the problem of inaccuracy. In this embodiment, the total centroid state estimation method is a computer-implemented method executable for a processor. The method may be implemented through a total centroid state estimation apparatus shown in FIG. 5. As shown in FIG. 1, the method may include the following steps.

S110: obtaining a motion state of each real joint of the humanoid robot and a motion state of a virtual floating base of the humanoid robot, obtaining a plurality of sequentially-connected virtual joints equivalent to the floating base, and calculating a motion state of each of the virtual joints based on the motion state of the floating base.

In one embodiment, the motion state of the corresponding real joint, for example, the position, the velocity and the acceleration of the real joint, can be collected through the joint encoder, the sensor or the like that is disposed at the real joint. In which, the motion state of the floating base may include the position, the velocity and the acceleration of the floating frame of the robot. For the motion state of the floating base, as an example, the inertial measurement unit (IMU) disposed on the trunk of the robot can be used to obtain the pose (i.e., the centroidal position and the upper-body posture) of the robot, that is, the pose of the floating base in the world coordinate system.

In which, the above-mentioned real joint refers to a joint in the humanoid robot that is driven by a corresponding joint motor, and the virtual joint refers to the equivalent joint in the humanoid robot that forms the floating-base and is measured by the IMU and is between the trunk of the robot and the origin of the world coordinate system. It should be noted that, each virtual joint also has a corresponding virtual link.

During the robot walks, since the robot coordinate system is in a motion state relative to the world coordinate system, the motion state of the floating base also needs to be considered when solving the Jacobian matrix of the centroid of each link. In this embodiment, the floating base is equivalent to a plurality of virtual joints connected in sequence. As an example, the floating base may be regarded as 6 virtual joints (i.e., 6 degrees of freedom) from the origin of the robot coordinate system of the robot to the origin of the world coordinate system, which may include 3 revolute joints and 3 prismatic joints. Each virtual joint has a corresponding joint position, velocity and acceleration. At this point, the origin of the robot coordinate system can be reached by starting from the origin of the world coordinate system and passing through the six sequentially-connected virtual joints. When the motion state of the floating base (equivalent to an end) is known, the motion state of each virtual joint may also be calculated through the chain rule of homogeneous multiplication.

In this embodiment, to solve the Jacobian matrix of the total centroid of the humanoid robot, the Jacobian matrix of the centroid of each link (also called the joint centroid) will be sequentially solved. Then a total mass equation will be used to solve the Jacobian matrix of the total centroid of the robot.

S120: calculating a joint position, a centroid position, and a rotation matrix of the k-th link among k links of the humanoid robot in a world coordinate system in an order of the k-th link in the k links using the chain rule of homogeneous multiplication according to the position of the joint corresponding to the k-th link, and solving a Jacobian matrix of a centroid of the k-th link according to joint positions, centroid positions, and rotation matrices of k links relative to an origin of the world coordinate system, where the value of k of the k-th link in the k links is from 1 to $n_d$, respectively, and $n_d$ is the sum of degrees of freedom of the joints of the humanoid robot, that is, the sum of degrees of freedom of the real joint and that of the virtual joint.

Since the orientation of all points in the same link are the same, the rotational matrices of the joint and the centroid of the link are identical, which also meets the chain rule of homogeneous multiplication, and there is a difference of a constant distance between the joint position of the link and the centroid position of the link, these two coordinate positions can be calculated through the chain rule of homogeneous multiplication. Or after obtaining any one of the two coordinate positions of the centroid position and the joint position of a single link, the other coordinate position may also be calculated through the above-mentioned distance constant.

In this embodiment, it will start to calculate the pose of each link sequentially from the fixed origin of the world coordinate system. For example, the position of each joint in the world coordinate system may be calculated in turn through the chain rule of homogeneous multiplication of forward kinematics.

Taking the k-th link as an example, according to the chain rule of homogeneous multiplication, the homogeneous transformation matrix (referred to as the transformation matrix) of the k-th joint in the world coordinate system may be calculated through an equation of:

$$T_k^0 = T_1^0 \cdots T_j^{j-1} \cdots T_k^{k-1} = \prod_{j=1}^{k} T_j^{j-1};$$

where, $T_1^0$ represents the matrix transforming the description of the 1st link in the local coordinate system $O_1$ to the world coordinate system $O_0$, $T_j^{j-1}$ represents transforming the description of the j-th link in its local coordinate system to the adjacent i−1-th local coordinate system. For example, if k=3, $T_3^0 = T_1^0 T_2^1 T_3^2$. To facilitate the calculation of the relevant information of each link, a coordinate system origin at the joint connection corresponding to each link will usually be selected for creating an accessory coordinate system (also known as a local coordinate system).

Similarly, according to the chain rule of homogeneous multiplication, the transformation matrix $T_{com\{k\}}^0$ of the centroid of the k-th link in the world coordinate system may be calculated through an equation of $$T_{com\{k\}}^0 = \prod_{i=1}^{com\{k\}} T_i^{j-1}$$

Therefore, by solving the transformation matrix of each link, the centroid position, the joint position and the rotation matrix of the link can be directly obtained. For example, for the k-th link, the correspond transformation matrix, centroid position and rotation matrix meet an equation of:

$$T^0_{com\{k\}} = \begin{bmatrix} R^0_k & p^0_{com\{k\}} \\ 0 & 1 \end{bmatrix};$$

where, $R_k^0$ represents the posture of the k-th link in the world coordinate system, which is a 3*3 matrix. When $p_{com\{k\}}^0$ is converted to a 3*1 row vector, which represents the centroid position of the k-th link in the world coordinate system.

Taking the 1st link as an example, if its local coordinate system is $O_1$ and the world coordinate system is $O_0$, the coordinate position $p_{com\{1\}}$ of the centroid of the link in the coordinate system $O_1$ is known as $p_{com\{1\}} = \{x_{com\{1\}}\ y_{com\{1\}}\ z_{com\{1\}}\}$, and it will rotate for an angle $\varphi$ along the Y axis of the coordinate system $O_0$ when transforming from the coordinate system $O_0$ coordinate to the coordinate system $O_1$ hence the transformation matrix $T_1^0$ of the centroid of the link in the coordinate system $O_0$ may be calculated according to the homogeneous transformation through an equation of:

$$T_1^0 = \begin{bmatrix} \cos(\varphi) & 0 & \sin(\varphi) & 0 \\ 0 & 1 & 0 & 0 \\ -\sin(\varphi) & 0 & \cos(\varphi) & 0 \\ 0 & 0 & 0 & 1 \end{bmatrix} \begin{bmatrix} 1 & 0 & 0 & x_{com\{1\}} \\ 0 & 1 & 0 & y_{com\{1\}} \\ 0 & 0 & 1 & z_{com\{1\}} \\ 0 & 0 & 0 & 1 \end{bmatrix}$$

$$= \begin{bmatrix} \cos(\varphi) & 0 & \sin(\varphi) & \cos(\varphi)x_{com\{1\}} \\ 0 & 1 & 0 & y_{com\{1\}} \\ -\sin(\varphi) & 0 & \cos(\varphi) & \cos(\varphi)z_{com\{1\}} \\ 0 & 0 & 0 & 1 \end{bmatrix}$$

According to the above-mentioned homogeneous transformation matrix, the posture (i.e., the rotation matrix) $R_1^0$ of the link in the world coordinate system $O_0$ and the coordinate position $p_{com\{1\}}^0$ in the world coordinate system $O_0$ are respectively:

$$R_1^0 = \begin{bmatrix} \cos(\varphi) & 0 & \sin(\varphi) \\ 0 & 1 & 0 \\ -\sin(\varphi) & 0 & \cos(\varphi) \end{bmatrix}; \text{ and}$$

$$p_{com\{1\}}^0 = \{\cos(\varphi)x_{com\{1\}}\ y_{com\{1\}}\ \cos(\varphi)z_{com\{1\}}\}$$

It should be noted that, for other link, all homogeneous transformation matrices from the origin of the world coordinate system to the corresponding link need to be considered.

For the above-mentioned step S120, after obtaining the joint position, the centroid position, and the rotation matrix of the corresponding link, the Jacobian matrix of the centroid of the corresponding link can be further calculated.

Figure 2:
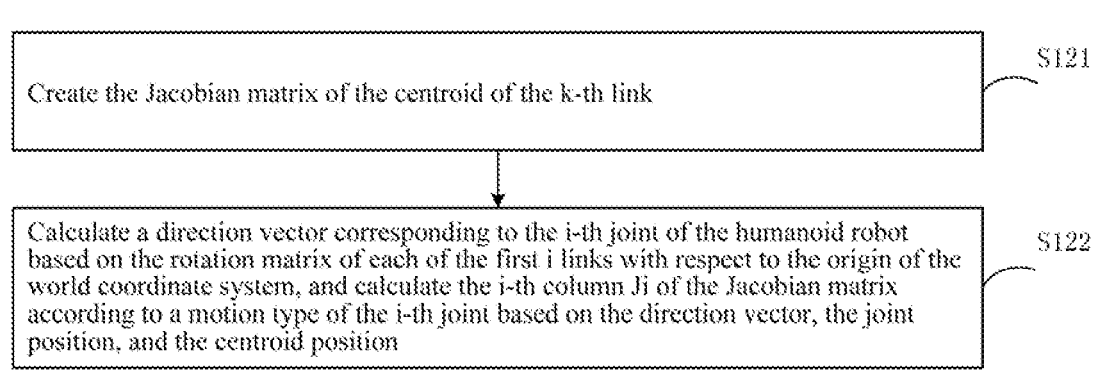
FIG. 2 is a flow chart of an example of solving a Jacobian matrix corresponding to the centroidal position of an individual link in the total centroid state estimation method of FIG. 1.

FIG. 2 is a flow chart of an example of solving a Jacobian matrix corresponding to the centroidal position of an individual link in the total centroid state estimation method of FIG. 1. In this embodiment, as shown in FIG. 2, when solving the Jacobian matrix of the centroid of a single link, taking the centroid of the k-th link as an example, step S120 may include the following sub-steps.

S121: creating the Jacobian matrix $J_{com\{k\}}^0$ of the centroid of the k-th link, where $J_{com\{k\}}^0 = [J_1 \ldots J_i \ldots J_k]$, and the value of i takes 1, . . . , k in turn.

S122: calculating a direction vector corresponding to the i-th joint of the humanoid robot based on the rotation matrix of each of the first i links with respect to the origin of the world coordinate system, and calculating the i-th column $J_i$ of the Jacobian matrix $J_{com\{k\}}^0$ according to a motion type of the i-th joint based on the direction vector, the joint position, and the centroid position.

For other columns $J_i$, it can be solved through an equation of:

$$J_i = \begin{bmatrix} z_i \times (p_{com\{k\}}^0 - p_i^0) \\ z_i \end{bmatrix}, \quad \text{if the motion type of the i-th joint is that of a revolute joint; and}$$

$$\begin{bmatrix} z_i \\ 0 \end{bmatrix}, \quad \text{if the motion type of the i-th joint is that of a prismatic joint;}$$

where, $z_i$ is the direction vector corresponding to the i-th joint, $z_i = R_i^0 k$, $R_i^0$ is the rotation matrix of the i-th link, k is the unit coordinate vector; $p_{com\{k\}}^0$ is the centroid position of the k-th link in the world coordinate system, and $p_i^0$ is the joint position of the i-th link in the world coordinate system.

It should be noted that, for each link centroid k, the Jacobian matrix $J_{com\{k\}}^0$ may be calculated through the above-mentioned equation. After the Jacobian matrix of the centroid of all the links are obtained, the Jacobian matrix of the total centroid can be solved.

S130: solving a total centroid Jacobian matrix of the humanoid robot based on the Jacobian matrix of the centroid of each of the k links and a total mass of the humanoid robot.

As an example, if the total mass of the humanoid robot is M, the total joint degrees of freedom is $n_d$, and the Jacobian matrix of the centroid of the k-th link is $J_{com\{k\}}$, the Jacobian matrix $J_{com}$ of the total centroid may be calculated through an equation of:

$$J_{com} = \frac{1}{M}\sum_{k=1}^{n_d} m_k J_{com\{k\}}$$

S140: calculating the total centroid velocity of the humanoid robot based on the total centroid Jacobian matrix and the velocity of each of the real joint and the virtual joint.

As an example, if the solved Jacobian matrix of the total centroid of the robot is $J_{com}$, the velocity of all the real joints of the robot is $\dot{q}$, and the velocity of the floating base (i.e., the velocity of all the virtual joints) is $\dot{q}_f$, the velocity $\dot{x}_{com}$ of the total centroid of the robot may be calculated through an equation of $$\dot{x}_{com} = J_{com} \begin{bmatrix} \dot{q}_f \\ \dot{q} \end{bmatrix}$$

It should be noted that, the above-mentioned velocity $\dot{q}_f$ of the floating base is obtained by performing spatial decoupling on the measurement results of the IMU. As an example, when the posture angle and angular velocity of the humanoid robot in the world coordinate system are measured by the IMU, the angular velocity spatial decoupling is performed based on the posture angle and the angular velocity to obtain the velocity of the floating base of the humanoid robot. In addition, for the acceleration of the floating base, the acceleration of the floating bae may be obtained by performing angular acceleration spatial decoupling on the posture angle, the angular acceleration and the angular acceleration measured by the IMU.

In one embodiment, the spatial decoupling of the angular velocity or angular acceleration may be realized through a corresponding transformation matrix. Through the transformation matrix, the quantities in the three-dimensional (3D) space can be projected to the x-z plane and the y-z plane, respectively, to form two mutual independent plane quantities to realize decoupling.

As an example, the velocity of the floating base may be calculated through an equation of:

$$\dot{q}_f = \begin{bmatrix} \overline{\omega}_x \\ \overline{\omega}_y \\ \overline{\omega}_z \end{bmatrix} = \begin{bmatrix} \cos(\gamma_{pitch})\cos(\gamma_{yaw}) & -\sin(\gamma_{yaw}) & 0 \\ \cos(\gamma_{pitch})\sin(\gamma_{yaw}) & \cos(\gamma_{yaw}) & 0 \\ -\sin(\gamma_{pitch}) & 0 & 1 \end{bmatrix} \begin{bmatrix} \dot{\gamma}_{roll} \\ \dot{\gamma}_{pitch} \\ \dot{\gamma}_{yaw} \end{bmatrix};$$

where, $\overline{\omega}_x$, $\overline{\omega}_y$, $\overline{\omega}_z$, are the components of the angular velocity of the floating base at the x, y and z directions, respectively; $\gamma_{pitch}$ and $\gamma_{yaw}$ are the pitch angle and yaw angle measured by the IMU, respectively; and $\dot{\gamma}_{roll}$, $\dot{\gamma}_{pitch}$, and $\dot{\gamma}_{yaw}$ are the angular velocities of the roll angle, the pitch angle and the yaw angle, respectively.

Furthermore, as an example, the acceleration $\ddot{q}_f$ of the flouting base may be calculated through an equation of:

$$\ddot{q}_f = \begin{bmatrix} \overline{\dot{\omega}}_x \\ \overline{\dot{\omega}}_y \\ \overline{\dot{\omega}}_z \end{bmatrix} = \begin{bmatrix} \cos(\gamma_{pitch})\cos(\gamma_{yaw}) & -\sin(\gamma_{yaw}) & 0 \\ \cos(\gamma_{pitch})\sin(\gamma_{yaw}) & \cos(\gamma_{yaw}) & 0 \\ -\sin(\gamma_{pitch}) & 0 & 1 \end{bmatrix} \begin{bmatrix} \ddot{\gamma}_{roll} \\ \ddot{\gamma}_{pitch} \\ \ddot{\gamma}_{yaw} \end{bmatrix} + \begin{bmatrix} -\sin(\gamma_{pitch})\dot{\gamma}_{pitch}\cos(\gamma_{yaw}) - & -\cos(\gamma_{yaw})\dot{\gamma}_{yaw} & 0 \\ \cos(\gamma_{pitch})\sin(\gamma_{yaw})\dot{\gamma}_{yaw} & & \\ -\sin(\gamma_{pitch})\dot{\gamma}_{pitch}\sin(\gamma_{yaw}) + & -\sin(\gamma_{yaw})\dot{\gamma}_{yaw} & 0 \\ \cos(\gamma_{pitch})\cos(\gamma_{yaw})\dot{\gamma}_{yaw} & & \\ -\cos(\gamma_{pitch})\dot{\gamma}_{pitch} & & 0 \end{bmatrix} \begin{bmatrix} \dot{\gamma}_{roll} \\ \dot{\gamma}_{pitch} \\ \dot{\gamma}_{yaw} \end{bmatrix};$$

where, $\overline{\dot{\omega}}_x$, $\overline{\dot{\omega}}_y$, $\overline{\dot{\omega}}_z$ are the components of the acceleration of the floating base in the x, y and z directions, respectively; and $\ddot{\gamma}_{roll}$, $\ddot{\gamma}_{pitch}$, and $\ddot{\gamma}_{yaw}$ are the angular accelerations of the roll angle, the pitch angle and the yaw angle, respectively.

This is because the sequence of the transformation of the 6 virtual joints of the floating base is usually $D_X$, $D_Y$, $D_Z$, $R_X$, $R_Y$, and $R_Z$, and the coordinate conversion is performed by matrix multiplication since the output of the IMU is generally in the rotation sequence of R-P-Y (which corresponds to the rotation around the X, Y and Z axis, respectively) when the IMU is used to obtain the motion state of the floating base of the humanoid robot, there is a coupling between the velocity components. In this embodiment, in order to facilitate the subsequent null space calculations and other applications such as inner loop anti-disturbance control based on the null space, decoupling will be performed first, so that the velocity of the floating base can be calculated through linear addition directly instead of matrix multiplication. The velocity of the floating base in the above-mentioned equation for calculating the velocity of the total centroid is just the decoupled velocity.

In this embodiment, the total centroid state estimation method considers the motion state of each real joint and taking the floating base as a plurality of equivalent virtual joints into account. It evaluates the motion state of the floating base based on the IMU to solve the motion state of each virtual joint; calculates the joint position, the centroid position, and the rotation matrix of each link in the world coordinate system using forward kinematics based on the motion state of each joint, then solve the Jacobian matrix of the centroid of each link in turn and obtain the analytical expression of the Jacobian matrix through cross-product; and finally solves the related equations to obtain the velocity of the total centroid. That is, a feasible calculation method is provided, and the accuracy and efficiency can be effectively improved through the calculation method, thereby providing a data basis for the full motion state estimation and motion control of the humanoid robot.

Embodiment 2

Figure 3:
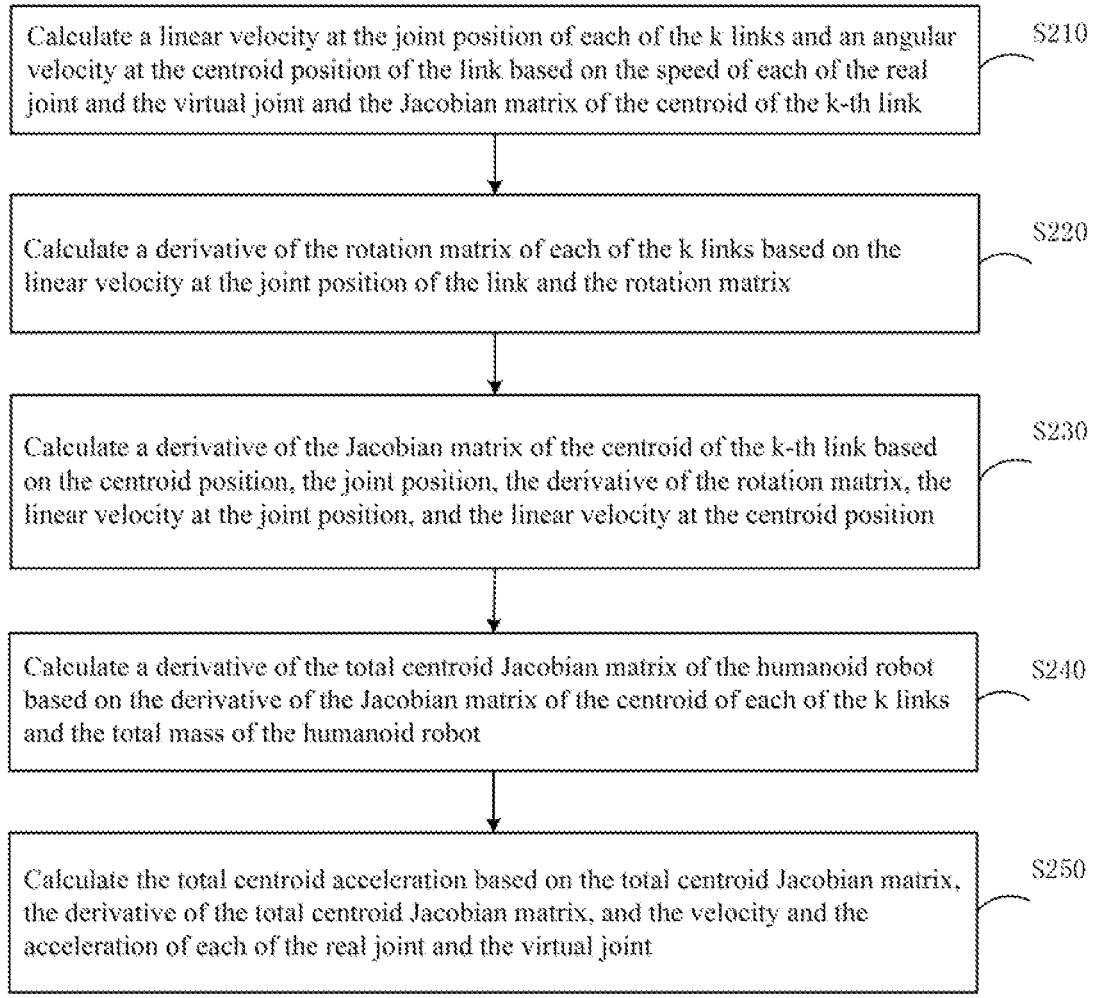
FIG. 3 is a flow chart of another embodiment of a total centroid state estimation method according to the present disclosure.

FIG. 3 is a flow chart of another embodiment of a total centroid state estimation method according to the present disclosure. As shown in FIG. 3, in this embodiment, another total centroid state estimation method based on the method of the above-mentioned embodiment 1 is provided. In which, the total centroid state of the humanoid robot further includes the acceleration of the total centroid. After solving the Jacobian matrix of the total centroid, the method mainly focuses on the calculation of the acceleration of the total centroid.

In this embodiment, to calculate the derivative of the Jacobian matrix of the total centroid, the derivative of the Jacobian matrix of the centroid of each link is first solved based on the velocity of each joint and the Jacobian matrix of the centroid of the corresponding link, then the derivative of the Jacobian matrix of the total centroid of the humanoid robot is calculated according to the corresponding equation. The derivative of the Jacobian matrix of the total centroid can be used to calculate the acceleration of the total centroid.

As an example, in this embodiment, after the Jacobian matrix of the centroid of a single link is solved using the method of the above-mentioned embodiment 1, the derivative of each column in the Jacobian matrix of the centroid of the link may be calculated to obtain the derivative of the Jacobian matrix of the centroid of the link.

Taking the k-th link as an example, the derivative of the i-th column $J_i$ in the above-mentioned Jacobian matrix $J_{com\{k\}}^0$ is calculated, that is, the derivative $\dot{J}_i$ meets an equation of:

$$\dot{J}_i = \frac{\partial}{\partial t} \begin{bmatrix} z_i \times (p_{com\{k\}}^0 - p_i^0) \\ z_i \end{bmatrix} = \begin{bmatrix} \dot{z}_i \times (p_{com\{k\}}^0 - p_i^0) + z_i \times (\dot{p}_{com\{k\}}^0 - \dot{p}_i^0) \\ \dot{z}_i \end{bmatrix};$$

where, $\dot{z}_i$ is the derivative of the direction vector corresponding to the i-th joint, $\dot{p}_{com\{k\}}^0$ is the derivative of the centroid position of the k-th link (i.e., the linear velocity at the centroid position of the k-th link in the world coordinate system), and $\dot{p}_i^0$ is the derivative of the joint position of the i-th join link (i.e., the linear velocity at the joint position of the i-th link in the world coordinate system). The centroid or joint position is the equivalent position in the operational space.

From the definition of the direction vector $z_i$, it can be seen that $\dot{z}_i = \dot{R}_i^0 k + R_i^0 \dot{k} = \dot{R}_i^0 k$, where $\dot{R}_i^0$ represents the derivative of the rotation matrix of the i-th link. On the other hand, the derivative of the rotation matrix meets the equation $\dot{R}_i^0 = S(\omega_i^0) R_i^0$, where $\omega_i^0$ is the 3D angular velocity of the i-th joint in the world coordinate system, which is expressed as the column vector $[\omega_{i\{x\}}^0 \ \omega_{i\{y\}}^0 \ \omega_{i\{z\}}^0]^T$, and the function $S(\ )$ represents transforming the vector into a skew symmetric matrix. $S(\omega_i^0)$ is expressed as an equation of:

$$S(\omega_i^0) = \begin{bmatrix} 0 & -\omega_{i(z)}^0 & \omega_{i(y)}^0 \\ \omega_{i(z)}^0 & 0 & -\omega_{i(x)}^0 \\ -\omega_{i(y)}^0 & \omega_{i(z)}^0 & 0 \end{bmatrix}.$$

For this reason, in this embodiment, the velocity vector of each link in the operational space needs to be solved first to use to calculate the derivative of the rotation matrix of the corresponding link, then calculate the derivative of the Jacobian matrix of the centroid of the corresponding link, and finally calculate the derivative of the Jacobian matrix of the total centroid.

As shown in FIG. 3, the method may include the following steps.

S210: calculating a linear velocity at the joint position of each of the k links and an angular velocity at the centroid position of the link based on the velocity of each of the real joint and the virtual joint and the Jacobian matrix of the centroid of the k-th link.

In one embodiment, if the linear velocity at the centroidal position of the i-th link is $\dot{p}_{com\{k\}}^0$. It can be calculated through an equation of:

$$\dot{p}_{com\{k\}}^0 = J_{com\{k\}}^0 \begin{bmatrix} \dot{q}_f \\ \dot{q} \end{bmatrix};$$

where, $\dot{q}$ represents the velocity of all the real joints of the humanoid robot, $\dot{q}_f$ represents the velocity of all the virtual joints of the humanoid robot, and $J_{com\{k\}}^0$ represents the Jacobian matrix obtained from the origin of the fixed origin to the centroidal portion of the k-th link.

If the linear velocity at the joint position of the i-th link is $\dot{p}_i^0$, and the angular velocity of the link is $\omega_i$, they can be calculated through an equation of:

$$\begin{bmatrix} \dot{p}_i^0 \\ \omega_i \end{bmatrix} = J_i^0 \begin{bmatrix} \dot{q}_f \\ \dot{q} \end{bmatrix};$$

where, $J_i^0$ the Jacobian matrix obtained from the origin of the fixed origin to the joint of the i-th link.

S220: calculating a derivative of the rotation matrix of each of the k links based on the linear velocity at the joint position of the link and the rotation matrix.

In one embodiment, an angular velocity skew symmetric matrix is obtained by transforming the angular vector at the centroid position of the i-th link into a skew symmetric matrix, and the derivative of the rotation matrix of the i-th link is calculated by substituting the angular velocity skew symmetric matrix and the rotation matrix of the i-th link into the equation $\dot{R}_i^0 = S(\omega_i^0) R_i^0$.

S230: calculating a derivative of the Jacobian matrix of the centroid of the k-th link based on the centroid position, the joint position, the derivative of the rotation matrix, the linear velocity at the joint position, and the linear velocity at the centroid position.

Figure 4:
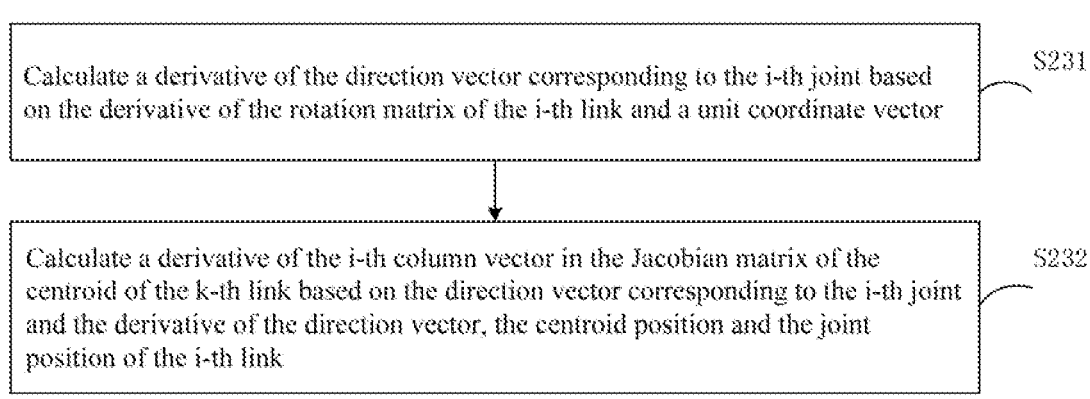
FIG. 4 is a flow chart of an example of calculating a derivative of a rotation matrix of a link in the total centroid state estimation method of FIG. 2.

FIG. 4 is a flow chart of an example of calculating a derivative of a rotation matrix of a link in the total centroid state estimation method of FIG. 2. As shown in FIG. 4, in this embodiment, step S230 may include the following sub-steps.

S231: calculating a derivative of the direction vector corresponding to the i-th joint based on the derivative of the rotation matrix of the i-th link and a unit coordinate vector.

In one embodiment, after the derivative of the rotation matrix of the i-th link is calculated, the derivative of the above-mentioned direction vector z corresponding to the i-th link may be calculated based on the derivative equation of the direction vector $z_i$.

S232: calculating a derivative $\dot{J}_i$ of the i-th column vector in the Jacobian matrix of the centroid of the k-th link based on the direction vector corresponding to the i-th joint and the derivative of the direction vector, the centroid position and the joint position of the i-th link.

In one embodiment, the obtained direction vector $z_i$, the derivative of the direction vector $\dot{z}_i$, the centroid position $p_{com\{k\}}^0$ and its linear velocity $\dot{p}_{com\{k\}}^0$, the joint position $p_i^0$ and its linear velocity $\dot{p}_i^0$ are respectively substituted into the derivation equation of the i-th column $J_i$ in the above-mentioned Jacobian matrix, and then the derivative $\dot{J}_i$ of the i-th column vector can be obtained.

It should be noted that, the value of i takes 1, ..., k in turn. For each link between the value of 1 and k, it can be calculated in the same way as above. Thus, the derivative $\dot{J}_{com\{k\}}$ of the Jacobian matrix of the centroid of the k-th link can be calculated. It should be noted that the value of k takes 1, ..., $n_d$ in turn. Thus, the derivative of the Jacobian matrix of the centroid of each link can be calculated.

S240: calculating a derivative of the total centroid Jacobian matrix of the humanoid robot based on the derivative of the Jacobian matrix of the centroid of each of the k links and the total mass of the humanoid robot.

In one embodiment, the derivative $\dot{J}_{com}$ of the Jacobian matrix of the total centroid may be calculated through an equation of:

$$\dot{J}_{com} = \frac{1}{M} \sum_{k=1}^{n_d} m_k \dot{J}_{com\{k\}}$$

S250: calculating the total centroid acceleration based on the total centroid Jacobian matrix, the derivative of the total centroid Jacobian matrix, and the velocity and the acceleration of each of the real joint and the virtual joint.

In one embodiment, the acceleration $\ddot{X}_{com}$ of the total centroid may be calculated through an equation of:

$$\ddot{X}_{com} = \dot{J}_{com} \begin{bmatrix} \dot{q}_f \\ \dot{q} \end{bmatrix} + J_{com} \begin{bmatrix} \ddot{q}_f \\ \ddot{q} \end{bmatrix};$$

where, $\dot{q}$ and $\ddot{q}$ are the velocity and the acceleration of each real joint, respectively; and $\dot{q}_f$ and $\ddot{q}_f$ are the velocity and the acceleration of the floating base, respectively, that is, the velocity and the acceleration of each virtual joint, respectively.

Furthermore, as an example, the total centroid state of the humanoid robot may further include a total centroid position. Correspondingly, after the centroid position of all the links are calculated, the method further includes:

calculating the total centroid position of the humanoid robot based on the centroid position of each link and the total mass of the humanoid robot. For example, if the position of the centroid of the k-th link in the world coordinate system is $p_{com\{k\}}^0$, the total centroid position $p_{com}$ can be calculated through the equation $$p_{com} = \sum_{k=1}^{n_d} m_k p_{com(k)}^0.$$

In this embodiment, the total centroid state estimation method mainly calculates the acceleration of the total centroid. By combined with the method of the above-mentioned embodiment 1, the total centroid state estimation method calculates the Jacobian matrix of the total centroid and the analytical expression of its derivative in a recursive manner, which can easily calculate the full motion state of the total centroid of the robot including the position, the velocity and the acceleration, and is convenient to control the whole-body motion of the humanoid robot. In addition, this method can not only be applied to the calculation of the Jacobian matrix of the total centroid and its derivative to improve the calculation efficiency and accuracy, but also can be applied to the calculation of the Jacobian matrix of any other position in the structure of the robot and its derivative.

Embodiment 3

Figure 5:
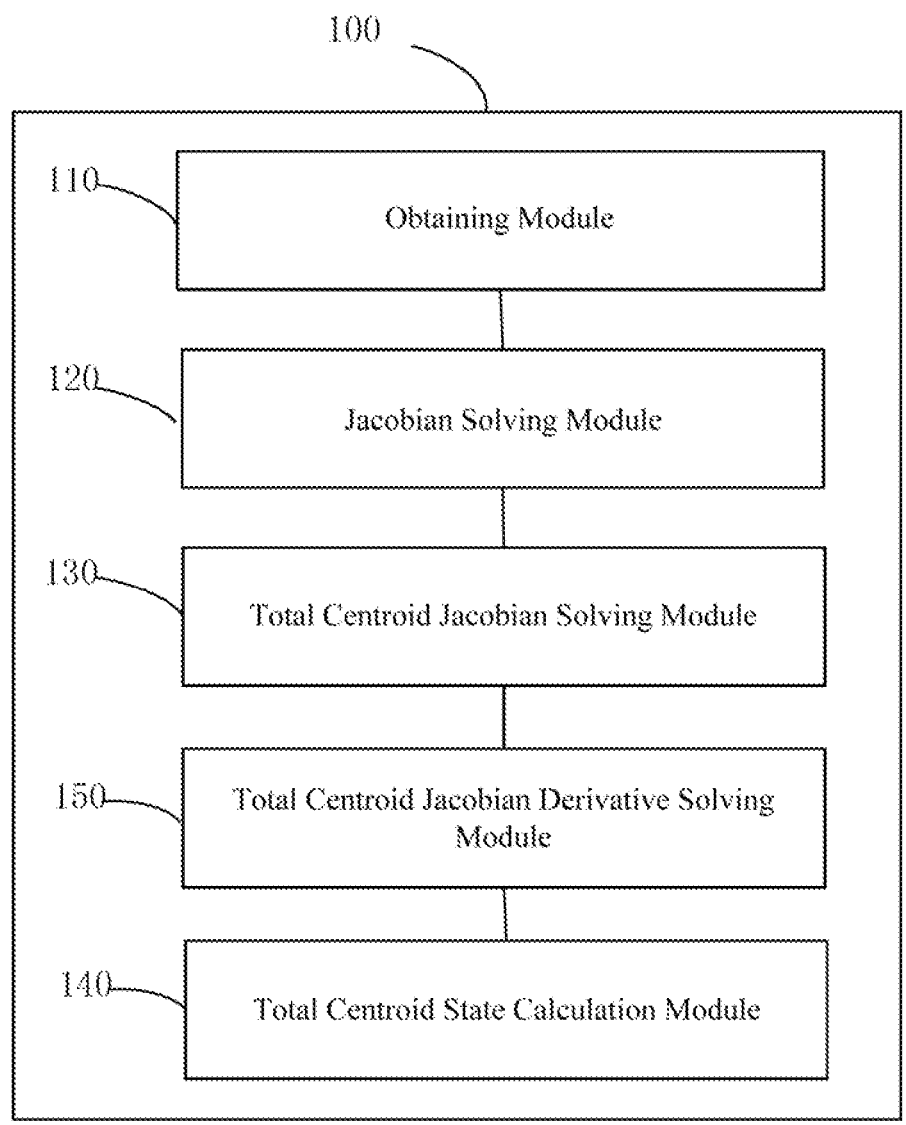
FIG. 5 is a schematic block diagram of the first embodiment of a total centroid state estimation apparatus according to the present disclosure.

FIG. 5 is a schematic block diagram of the first embodiment of a total centroid state estimation apparatus according to the present disclosure. As shown FIG. 5, in this embodiment, based on the method of the above-mentioned embodiment 1, a total centroid state estimation apparatus 100 which may be applied to a humanoid robot (as, for example, a part of the control system of the humanoid robot) is provided. The total centroid state of the humanoid robot includes the total centroid velocity, and the total centroid state estimation apparatus 100 includes:

an obtaining module 110 configured to obtain a motion state of each real joint of the humanoid robot and a motion state of a virtual floating base of the humanoid robot, obtain a plurality of sequential-connected virtual joints equivalent to the floating base, and calculate a motion state of each virtual joint based on the motion state of the floating base, wherein the motion state of each real joint and the motion state of each virtual joint includes a position and a velocity of the corresponding joint;

a Jacobian solving module 120 configured to calculate a joint position, a centroid position, and a rotation matrix of the k-th link among k links of the humanoid robot in a world coordinate system in an order of the k-th link in the k links using the chain rule of homogeneous multiplication according to the position of the joint corresponding to the k-th link, and solve a Jacobian matrix of a centroid of the k-th link according to joint positions, centroid positions, and rotation matrices of k links relative to an origin of the world coordinate system, wherein the value of k of the k-th link in the k links is from 1 to $n_d$, respectively, and $n_d$ is a sum of degrees of freedom of the virtual joint and the real joint of the humanoid robot;

a total centroid Jacobian solving module 130 configured to solve a total centroid Jacobian matrix of the humanoid robot based on the Jacobian matrix of the centroid of each of the k links and a total mass of the humanoid robot; and a total centroid state calculation module 140 configured to calculate the total centroid velocity of the humanoid robot based on the total centroid Jacobian matrix and the velocity of each of the real joint and the virtual joint.

Furthermore, as an example, the total centroid state estimation apparatus 100 further includes a total centroid Jacobian derivative solving module 150 configured to calculate the derivative of the Jacobian matrix of the centroid of the corresponding link based on the velocity of each joint and the Jacobian matrix of the centroid of the corresponding link, so as to calculate the derivative of the Jacobian matrix of the total centroid of the humanoid robot using the total mass and the derivative of the Jacobian matrix of the centroid of each link.

Figure 6:
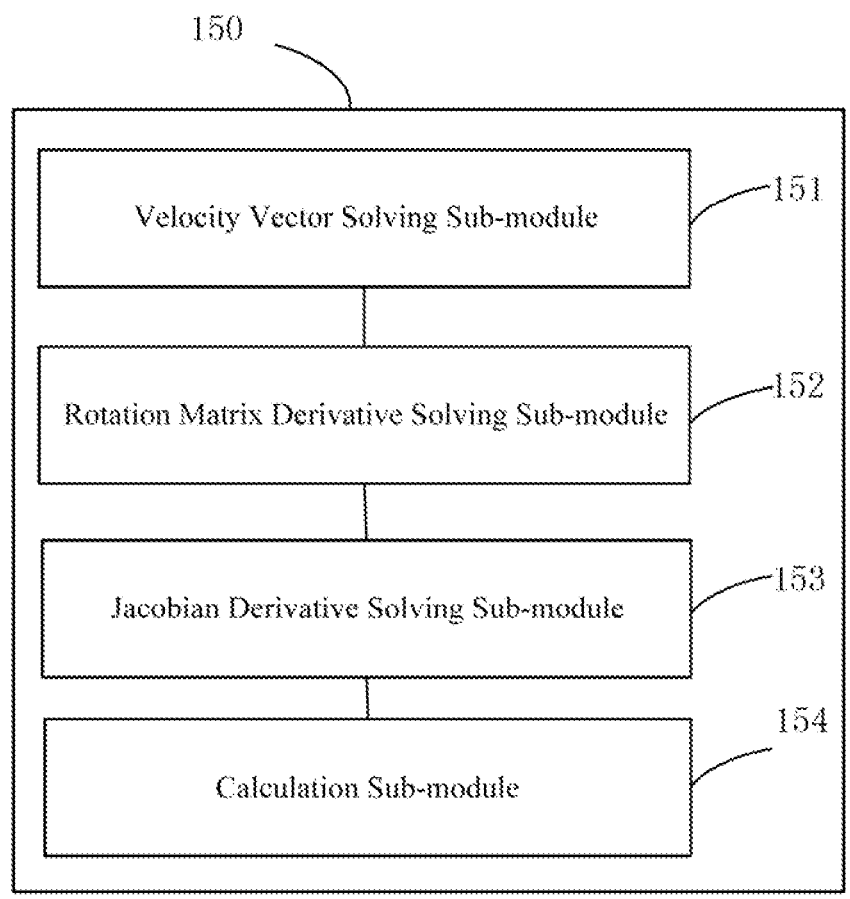
FIG. 6 is a schematic block diagram of an example of a total centroid Jacobian derivative solving module in the total centroid state estimation apparatus of FIG. 5.
Figure 7:
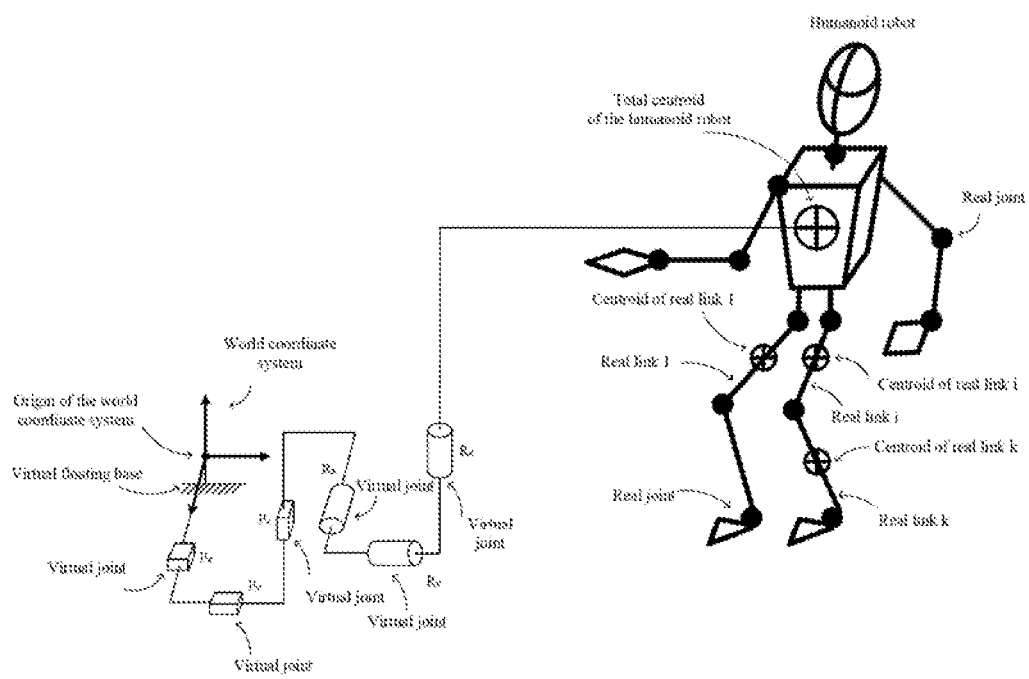
FIG. 7 is a schematic diagram of a humanoid robot in the total centroid state estimation method shown in FIG. 1 to FIG. 4.

FIG. 6 is a schematic block diagram of an example of a total centroid Jacobian derivative solving module in the total centroid state estimation apparatus of FIG. 5. As shown in FIG. 6, the total centroid Jacobian derivative solving module 150 may include:

a velocity vector solving sub-module 151 configured to calculate a linear velocity at the joint position of each of the k links and an angular velocity at the centroid position of the link based on the velocity of each real joint and the virtual joint and the Jacobian matrix of the centroid of the k-th link.

a rotation matrix derivative solving sub-module 152 configured to calculate a derivative of the rotation matrix of each of the k links based on the angular velocity at the join position of the link and the rotation matrix.

a Jacobian derivative solving sub-module 153 configured to calculate a derivative of the Jacobian matrix of the centroid of the k-th link based on the centroid position, the joint position, the derivative of the rotation matrix, the linear velocity at the joint position, and the linear velocity at the centroid position.

a calculation sub-module 154 configured to calculate a derivative of the total centroid Jacobian matrix of a humanoid robot based on the derivative of the Jacobian matrix of the centroid of each of the k links and the total mass of the humanoid robot.

In addition, the total centroid state calculation module 140 may further be configured to calculate the acceleration of the total centroid based on the Jacobian matrix of the total centroid obtained by the total centroid Jacobian solving module 130, the derivative of the Jacobian matrix of the total centroid obtained by the total centroid Jacobian derivative solving module 150, and the velocity and acceleration of each joint.

In this embodiment, it should be noted that the apparatus corresponds to the method of the foregoing embodiment 1 or 2, and the optional features of the foregoing embodiments 1 and 2 are also applicable to the apparatus, which will not be described in detail herein.

The present disclosure further provides a humanoid robot. In one embodiment, the robot includes a processor and a storage (e.g., a memory), wherein the storage stores a computer program, and the processor is configured to execute the computer program to implement the total centroid state estimation method in the above-mentioned embodiments.

The present disclosure further provides a non-transitory computer-readable storage medium storing with a computer program. The above-mentioned total centroid state estimation method will be implemented when the computer program is executed.

In the embodiments provided in the present disclosure, it should be understood that the disclosed device (apparatus)s and method may also be implemented in other manners. The device embodiments described above are only schematic. For example, the flowcharts and schematic diagrams in the drawings show the possible architectures, functions, and operations according to the devices, methods, and computer program products of the embodiments of the present disclosure. In this regard, each block in the flowchart or block diagram may represent a module, program segment, or part of codes, and the module, program segment, or part of codes contains one or more executable instructions for realizing the specified logic functions. It should also be noted that, in alternative implementations, the functions marked in the blocks may also execute in a different order from the order marked in the drawings. For example, two consecutive blocks can be executed basically in parallel, sometimes in reverse order, depending on the functions involved. It should also be noted that, each block in the schematic diagram and/or flowchart and the combination of the blocks in the schematic diagram and/or flowchart can be realized using a dedicated hardware-based system that executes specified functions or actions, or be realized using a combination of the dedicated hardware and computer instructions.

In addition, the functional modules or units in each embodiment of the present disclosure may be integrated together to form an independent part, or each module or unit may exist alone, or two or more modules or units may be integrated to form an independent part.

In the case that function(s) are implemented in the form of a software functional unit and sold or utilized as a separate product, they can be stored in a non-transitory computer readable storage medium. Based on this understanding, the technical solution of the present disclosure, either essentially or in part, contributes to the prior art, or a part of the technical solution can be embodied in the form of a software product. The software product is stored in a storage medium, which includes a plurality of instructions for enabling a computer device (which can be a smart phone, a personal computer, a server, a network device, or the like) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The forgoing is only the specific embodiment of the present disclosure, while the scope of the present disclosure is not limited thereto. For those skilled in the art, changes or replacements that can be easily conceived within the technical scope of the present disclosure should be included within the scope of the present disclosure.

What is claimed is:

1. A computer-implemented total centroid state estimation method for motion control of a humanoid robot, wherein a total centroid state of the humanoid robot comprises a total centroid velocity, and the method comprises steps of:
    providing the humanoid robot comprises a plurality of real joints, an inertial measurement unit (IMU) and a processor;
    obtaining, by the processor, a motion state of each real joint of the humanoid robot and a motion state of a virtual floating base of the humanoid robot, wherein the virtual floating base is represented by a plurality of sequentially-connected virtual joints, the sequentially-connected virtual joints refer to equivalent joints between a trunk of the humanoid robot and the origin of a world coordinate system, and the equivalent joints are measured by the IMU disposed on the trunk of the humanoid robot;
    calculating, by the processor, a motion state of each of the virtual joints based on the motion state of the virtual floating base, wherein the motion state of each real joint and the motion state of each virtual joint comprises a position and a velocity of the corresponding joint;
    calculating, by the processor, a joint position, a centroid position, and a rotation matrix of a k-th link among k links of the humanoid robot in h-c world coordinate system in an order of the k-th link in the k links using the chain rule of homogeneous multiplication according to the position of the joint corresponding to the k-th link, and solving a Jacobian matrix of the centroid of the k-th link according to joint positions, centroid positions, and rotation matrices of k links relative to, h origin of the world coordinate system, wherein the value of k of the k-th link in the k links is from 1 to $n_d$, respectively, and $n_d$ is a sum of degrees of freedom of the sequentially-connected virtual joints and each real joint of the humanoid robot;
    solving, by the processor, a total centroid Jacobian matrix of the humanoid robot based on the Jacobian matrix of the centroid of each of the k links and a total mass of the humanoid robot;
    calculating, by the processor, the total centroid velocity of the humanoid robot based on the total centroid Jacobian matrix and the velocity of each of the real joints and the sequentially-connected virtual joints; and
    controlling, by the processor, the humanoid robot to move according to the total centroid velocity of the humanoid robot.

2. The method of claim 1, wherein the motion state of each real joint further comprises an acceleration of each real joint, the motion state of each virtual joint further comprises an acceleration of each virtual joint, and the total centroid state of the humanoid robot further comprises a total centroid acceleration; and the method further comprises:
    calculating, by the processor, a linear velocity at the joint position of each of the k links and an angular velocity at the centroid position of the link based on the velocity of each of the real joints and the sequentially-connected virtual joints and the Jacobian matrix of the centroid of the k-th link;
    calculating, by the processor, a derivative of the rotation matrix of each of the k links based on the linear velocity at the joint position of the link and the rotation matrix;
    calculating, by the processor, a derivative of the Jacobian matrix of the centroid of the k-th link based on the centroid position, the joint position, the derivative of the rotation matrix, the linear velocity at the joint position, and the linear velocity at the centroid position;
    calculating, by the processor, a derivative of the total centroid Jacobian matrix of the humanoid robot based on the derivative of the Jacobian matrix of the centroid of each of the k links and the total mass of the humanoid robot; and
    calculating, by the processor, the total centroid acceleration based on the total centroid Jacobian matrix, the derivative of the total centroid Jacobian matrix, and the velocity and the acceleration of each of the real joints and the sequentially-connected virtual joints.

3. The method of claim 2, wherein the calculating, by the processor, the Jacobian matrix of the centroid of the k-th link according to joint positions, centroid positions, and rotation matrices of k links relative to the origin of the world coordinate system comprises:
    creating, by the processor, the Jacobian matrix $J_{com\{k\}}^0$ of the centroid of the k-th link, where $J_{com\{k\}}^0 = [J_1 \ldots J_i \ldots J_k]$;
    calculating, by the processor, a direction vector corresponding to an i-th joint of the humanoid robot based on the rotation matrix of each of the first i links with respect to the origin of the world coordinate system, and calculating the i-th column $J_i$ of the Jacobian matrix $J_{com\{k\}}^0$ according to a motion type of the i-th joint based on the direction vector, the joint position, and the centroid position through an equation of:

$$J_i = \begin{cases} \begin{bmatrix} z_i \times (p_{com\{k\}}^0 - p_i^0) \\ z_i \end{bmatrix}, \text{ if the } i\text{-th joint is the revolute joint; and} \\ \begin{bmatrix} z_i \\ 0 \end{bmatrix}, \text{ if the } i\text{-th joint is the prismatic joint;} \end{cases}$$

where, $z_i$ is the direction vector corresponding to the i-th joint, $p_{com\{k\}}^0$ is the centroid position of the k-th link in the world coordinate system, and $p_i^0$ is the joint position of the i-th link in the world coordinate system.

4. The method of claim 3, wherein the calculating, by the processor, the derivative of the rotation matrix of each of the k links based on the linear velocity at the centroid position of the link and the rotation matrix comprises:
obtaining, by the processor, an angular velocity skew symmetric matrix by performing skew symmetrization on the angular velocity at the centroid position of the i-th link, and calculating the derivative of the rotation matrix of the i-th link based on the angular velocity skew symmetric matrix and the rotation matrix of the i-th link.

5. The method of claim 4, wherein the calculating, by the processor, the derivative of the Jacobian matrix of the centroid of the k-th link based on the centroid position, the joint position, the derivative of the rotation matrix, the linear velocity at the joint position, and the linear velocity at the centroid position comprises:
calculating, by the processor, a derivative of the direction vector corresponding to the i-th joint based on the derivative of the rotation matrix of the i-th link and a unit coordinate vector;
calculating, by the processor, a derivative $\dot{J}_i$ of the i-th column vector in the Jacobian matrix of the centroid of the k-th link based on the direction vector corresponding to the i-th joint and the derivative of the direction vector, the centroid position and the joint position of the i-th link through an equation of:

$$\dot{J}_i = \frac{\partial}{\partial t}\begin{bmatrix} z_i(p_{com\{k\}}^0 - p_i^0) \\ z_i \end{bmatrix} = \begin{bmatrix} \dot{z}_i \times (p_{com\{k\}}^0 - p_i^0) + z_i \times (\dot{p}_{com\{k\}}^0 - \dot{p}_i^0) \\ \dot{z}_i \end{bmatrix};$$

where, $\dot{z}_i$ is the derivative of the direction vector corresponding to the i-th joint, $\dot{p}_{com\{k\}}^0$ is the linear velocity at the centroid position of the k-th link in the world coordinate system, and $\dot{p}_i^0$ is the linear velocity at the joint position of the i-th link in the world coordinate system.

6. The method of claim 1, wherein the total centroid state of the humanoid robot further comprises a total centroid position, and after the centroid position of all the links are calculated, the method further comprises:
calculating, by the processor, the total centroid position of the humanoid robot based on the centroid position of each link and the total mass of the humanoid robot.

7. The method of claim 1, wherein an inertial measurement unit is disposed on a trunk of the humanoid robot, and the obtaining, by the processor, the motion state of the viral floating base comprises:
measuring, by the processor, a posture angle, an angular velocity, and an angular acceleration of the humanoid robot in the world coordinate system through the inertial measurement unit;

obtaining, by the processor, a velocity of the virtual floating base of the humanoid robot by performing an angular velocity spatial decoupling based on the posture angle and the angular velocity; and
obtaining, by the processor, an acceleration of the virtual floating base of the humanoid robot by performing an angular acceleration spatial decoupling based on the posture angle, the angular velocity, and the angular acceleration.

8. A humanoid robot, comprising:
a processor;
an IMU;
a memory coupled to the processor; and
one or more computer programs stored in the memory and executable on the processor;
wherein, a total centroid state of the humanoid robot comprises a total centroid velocity, and the one or more computer programs comprise:
instructions for obtaining a motion state of each real joint of the humanoid robot and a motion state of a virtual floating base of the humanoid robot, wherein the virtual floating base is represented by a plurality of sequentially-connected virtual joints, the sequentially-connected virtual joints refer to equivalent joints between a trunk of the humanoid robot and the origin of a world coordinate system, and the equivalent joints are measured by the MU disposed on the trunk of the humanoid robot; and calculating a motion state of each of the virtual joints based on the motion state of the virtual floating base, wherein the motion state of each real joint and the motion state of each virtual joint comprises a position and a velocity of the corresponding joint;
instructions for calculating a joint position, a centroid position, and a rotation matrix of a k-th link among k links of the humanoid robot in a world coordinate system in an order of the k-th link in the k links using the chain rule of homogeneous multiplication according to the position of the joint corresponding to the k-th link, and solving a Jacobian matrix of the centroid of the k-th link according to joint positions, centroid positions, and rotation matrices of k links relative to the origin of the world coordinate system, wherein the value of k of the k-th link in the k links is from 1 to $n_d$, respectively, and $n_d$ is a sum of degrees of freedom of the sequentially-connected virtual joints and each real joint of the humanoid robot;
instructions for solving a total centroid Jacobian matrix of the humanoid robot based on the Jacobian matrix of the centroid of each of the k links and a total mass of the humanoid robot;
instructions for calculating the total centroid velocity of the humanoid robot based on the total centroid Jacobian matrix and the velocity of each of the real joints and the sequentially-connected virtual joints; and
instructions for controlling the humanoid robot to move according to the total centroid velocity of the humanoid robot.

9. The humanoid robot of claim 8, wherein the motion state of each real joint further comprises an acceleration of each real joint, the motion state of each virtual joint further comprises an acceleration of each virtual joint, and the total centroid state of the humanoid robot further comprises a total centroid acceleration; and the one or more computer programs further comprise:
instructions for calculating a linear velocity at the joint position of each of the k links and an angular velocity at the centroid position of the link based on the velocity of each of the real joints and the sequentially-connected virtual joints and the Jacobian matrix of the centroid of the k-th link;

instructions for calculating a derivative of the rotation matrix of each of the k links based on the linear velocity at the joint position of the link and the rotation matrix;

instructions for calculating a derivative of the Jacobian matrix of the centroid of the k-th link based on the centroid position, the joint position, the derivative of the rotation matrix, the linear velocity at the joint position, and the linear velocity at the centroid position;

instructions for calculating a derivative of the total centroid Jacobian matrix of the humanoid robot based on the derivative of the Jacobian matrix of the centroid of each of the k links and the total mass of the humanoid robot; and instructions for calculating the total centroid acceleration based on the total centroid Jacobian matrix, the derivative of the total centroid Jacobian matrix, and the velocity and the acceleration of each of the real joints and the sequentially-connected virtual joints.

10. The humanoid robot of claim 9, wherein the instructions for calculating the Jacobian matrix of the centroid of the k-th link according to joint positions, centroid positions, and rotation matrices of k links relative to the origin of the world coordinate system comprise:

instructions for creating the Jacobian matrix $J_{com\{k\}}^0$ of the centroid of the k-th link, where $J_{com\{k\}}^0 = [J_1 \ldots J_i \ldots J_k]$;

calculating a direction vector corresponding to an i-th joint of the humanoid robot based on the rotation matrix of each of the first i links with respect to the origin of the world coordinate system, and calculating the i-th column $J_i$ of the Jacobian matrix $J_{com\{k\}}^0$ according to a motion type of the i-th joint based on the direction vector, the joint position, and the centroid position through an equation of:

$$J_i = \begin{cases} \begin{bmatrix} z_i \times (p_{com\{k\}}^0 - p_i^0) \\ z_i \end{bmatrix}, \text{ if the } i\text{-th joint is the revolute joint; and} \\ \begin{bmatrix} z_i \\ 0 \end{bmatrix}, \text{ if the } i\text{-th joint is the prismatic joint;} \end{cases}$$

where, $z_i$ is the direction vector corresponding to the i-th joint, $p_{com\{k\}}^0$ is the centroid position of the k-th link in the world coordinate system, and $p_i^0$ is the joint position of the i-th link in the world coordinate system.

11. The humanoid robot of claim 10, wherein the instructions for calculating the derivative of the rotation matrix of each of the k links based on the linear velocity at the centroid position of the link and the rotation matrix comprise:

instructions for obtaining an angular velocity skew symmetric matrix by performing skew symmetrization on the angular velocity at the centroid position of the i-th link, and calculating the derivative of the rotation matrix of the i-th link based on the angular velocity skew symmetric matrix and the rotation matrix of the i-th link.

12. The humanoid robot of claim 11, wherein the instructions for calculating the derivative of the Jacobian matrix of the centroid of the k-th link based on the centroid position, the joint position, the derivative of the rotation matrix, the linear velocity at the joint position, and the linear velocity at the centroid position comprise:

instructions for calculating a derivative of the direction vector corresponding to the i-th joint based on the derivative of the rotation matrix of the i-th link and a unit coordinate vector;

instructions for calculating a derivative $\dot{J}_i$ of the i-th column vector in the Jacobian matrix of the centroid of the k-th link based on the direction vector corresponding to the i-th joint and the derivative of the direction vector, the centroid position and the joint position of the i-th link through an equation of:

$$\dot{J}_i = \frac{\partial}{\partial t}\begin{bmatrix} z_i(p_{com\{k\}}^0 - p_i^0) \\ z_i \end{bmatrix} = \begin{bmatrix} \dot{z}_i \times (p_{com\{k\}}^0 - p_i^0) + z_i \times (\dot{p}_{com\{k\}}^0 - \dot{p}_i^0) \\ \dot{z}_i \end{bmatrix};$$

where, $\dot{z}_i$ is the derivative of the direction vector corresponding to the i-th joint, $\dot{p}_{com\{k\}}^0$ is the linear velocity at the centroid position of the k-th link in the world coordinate system, and $\dot{p}_i^0$ is the linear velocity at the joint position of the i-th link in the world coordinate system.

13. The humanoid robot of claim 8, wherein the total centroid state of the humanoid robot further comprises a total centroid position, and the one or more computer programs further comprise:

instructions for calculating the total centroid position of the humanoid robot based on the centroid position of each link and the total mass of the humanoid robot.

14. The humanoid robot of claim 8, wherein an inertial measurement unit is disposed on a trunk of the humanoid robot, and the instructions for obtaining the motion state of the virtual floating base comprise:

instructions for measuring a posture angle, an angular velocity, and an angular acceleration of the humanoid robot in the world coordinate system through the inertial measurement unit;

instructions for obtaining a velocity of the virtual floating base of the humanoid robot by performing an angular velocity spatial decoupling based on the posture angle and the angular velocity; and instructions for obtaining an acceleration of the virtual floating base of the humanoid robot by performing an angular acceleration spatial decoupling based on the posture angle, the angular velocity, and the angular acceleration.

15. A non-transitory computer readable storage medium for storing one or more computer programs, wherein a total centroid state of a humanoid robot comprises a total centroid velocity, and the one or more computer programs comprise:

instructions for obtaining a motion state of each real joint of the humanoid robot and a motion state of a virtual floating base of the humanoid robot, wherein the virtual floating base is represented by a plurality of sequentially-connected virtual joints, the sequentially-connected virtual joints refer to equivalent joints between a trunk of the humanoid robot and the origin of a world coordinate system, and the equivalent joints are measured by an IMU disposed on the trunk of the humanoid robot; and calculating a motion state of each of the virtual joints based on the motion state of the virtual floating base, wherein the motion state of each real joint and the motion state of each virtual joint comprises a position and a velocity of the corresponding joint;

instructions for calculating a joint position, a centroid position, and a rotation matrix of a k-th link among k links of the humanoid robot in a world coordinate system in an order of the k-th link in the k links using the chain rule of homogeneous multiplication according to the position of the joint corresponding to the k-th link, and solving a Jacobian matrix of the centroid of the k-th link according to joint positions, centroid positions, and rotation matrices of k links relative to the origin of the world coordinate system, wherein the value of k of the k-th link in the k links is from 1 to $n_d$, respectively, and $n_d$ is a sum of degrees of freedom of the sequentially-connected virtual joints and each real joint of the humanoid robot;

instructions for solving a total centroid Jacobian matrix of the humanoid robot based on the Jacobian matrix of the centroid of each of the k links and a total mass of the humanoid robot;

instructions for calculating the total centroid velocity of the humanoid robot based on the total centroid Jacobian matrix and the velocity of each of the real joints and the sequentially-connected virtual joints; and instructions for controlling the humanoid robot to move according to the total centroid velocity of the humanoid robot.

16. The storage medium of claim 15, wherein the motion state of each real joint further comprises an acceleration of each real joint, the motion state of each virtual joint further comprises an acceleration of each virtual joint, and the total centroid state of the humanoid robot further comprises a total centroid acceleration; and the one or more computer programs further comprise:

instructions for calculating a linear velocity at the joint position of each of the k links and an angular velocity at the centroid position of the link based on the velocity of each of the real joints and the sequentially-connected virtual joints and the Jacobian matrix of the centroid of the k-th link;

instructions for calculating a derivative of the rotation matrix of each of the k links based on the linear velocity at the joint position of the link and the rotation matrix;

instructions for calculating a derivative of the Jacobian matrix of the centroid of the k-th link based on the centroid position, the joint position, the derivative of the rotation matrix, the linear velocity at the joint position, and the linear velocity at the centroid position;

instructions for calculating a derivative of the total centroid Jacobian matrix of the humanoid robot based on the derivative of the Jacobian matrix of the centroid of each of the k links and the total mass of the humanoid robot; and instructions for calculating the total centroid acceleration based on the total centroid Jacobian matrix, the derivative of the total centroid Jacobian matrix, and the velocity and the acceleration of each of the real joints and the sequentially-connected virtual joints.

17. The storage medium of claim 16, wherein the instructions for calculating the Jacobian matrix of the centroid of the k-th link according to joint positions, centroid positions, and rotation matrices of k links relative to the origin of the world coordinate system comprise:

instructions for creating the Jacobian matrix $J_{com\{k\}}^0$ of the centroid of the k-th link, where $J_{com\{k\}}^0 = [J_1 \ldots J_i \ldots J_k]$;

calculating a direction vector corresponding to a i-th joint of the humanoid robot based on the rotation matrix of each of the first i links with respect to the origin of the world coordinate system, and calculating the i-th column $J_i$ of the Jacobian matrix $J_{com\{k\}}^0$ according to a motion type of the i-th joint based on the direction vector the joint position, and the centroid position through an equation of:

$$J_i = \begin{cases} \begin{bmatrix} z_i \times (p_{com\{k\}}^0 - p_i^0) \\ z_i \end{bmatrix}, \text{ if the } i\text{-th joint is the revolute joint; and} \\ \begin{bmatrix} z_i \\ 0 \end{bmatrix}, \text{ if the } i\text{-th joint is the prismatic joint;} \end{cases}$$

where, $z_i$ is the direction vector corresponding to the i-th joint, $p_{com\{k\}}^0$ is the centroid position of the k-th link in the world coordinate system, and $p_i^0$ is the joint position of the i-th link in the world coordinate system.

18. The storage medium of claim 17, wherein the instructions for calculating the derivative of the rotation matrix of each of the k links based on the linear velocity at the centroid position of the link and the rotation matrix comprise:

instructions for obtaining an angular velocity skew symmetric matrix by performing skew symmetrization on the angular velocity at the centroid position of the i-th link, and calculating the derivative of the rotation matrix of the i-th link based on the angular velocity skew symmetric matrix and the rotation matrix of the i-th link.

19. The storage medium of claim 18, wherein the instructions for calculating the derivative of the Jacobian matrix of the centroid of the k-th link based on the centroid position, the joint position, the derivative of the rotation matrix, the linear velocity at the joint position, and the linear velocity at the centroid position comprise:

instructions for calculating a derivative of the direction vector corresponding to the i-th joint based on the derivative of the rotation matrix of the i-th link and a unit coordinate vector;

instructions for calculating a derivative $\dot{J}_i$ of the i-th column vector in the Jacobian matrix of the centroid of the k-th link based on the direction vector corresponding to the i-th joint and the derivative of the direction vector, the centroid position and the joint position of the i-th link through an equation of:

$$\dot{J}_i = \frac{\partial}{\partial t}\begin{bmatrix} z_i(p_{com\{k\}}^0 - p_i^0) \\ z_i \end{bmatrix} = \begin{bmatrix} \dot{z}_i \times (p_{com\{k\}}^0 - p_i^0) + z_i \times (\dot{p}_{com\{k\}}^0 - \dot{p}_i^0) \\ \dot{z}_i \end{bmatrix};$$

where, $\dot{z}_i$ is the derivative of the direction vector corresponding to the i-th joint, $\dot{p}_{com\{k\}}^0$ is the linear velocity at the centroid position of the k-th link in the world coordinate system, and $\dot{p}_i^0$ is the linear velocity at the joint position of the i-th link in the world coordinate system.

20. The storage medium of claim 15, wherein the total centroid state of the humanoid robot further comprises a total centroid position, and the one or more computer programs further comprise:

instructions for calculating the total centroid position of the humanoid robot based on the centroid position of each link and the total mass of the humanoid robot.

* * * * *